United States Patent
Bakhuis et al.

(10) Patent No.: US 7,988,421 B2
(45) Date of Patent: Aug. 2, 2011

(54) RETROFIT SLEEVE FOR WIND TURBINE BLADE

(75) Inventors: Jan W. Bakhuis, Nijverdal (NL); Klaus U. Koegler, Rheine (DE); Bart J. Veldkamp, Enschede (NL)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 12/415,105

(22) Filed: Mar. 31, 2009

(65) Prior Publication Data
US 2010/0135814 A1    Jun. 3, 2010

(51) Int. Cl.
*F03D 11/00* (2006.01)
(52) U.S. Cl. .................... 416/224; 416/229 R
(58) Field of Classification Search .............. 416/146 R, 416/224, 229 R, 241 R; 290/44, 55
See application file for complete search history.

(56) References Cited

U.S. PATENT DOCUMENTS

| | | | | |
|---|---|---|---|---|
| 1,404,849 | A | * | 1/1922 | Hamilton ................. 416/224 |
| 2,292,089 | A | * | 8/1942 | Reid ........................ 416/224 |
| 5,785,498 | A | * | 7/1998 | Quinn et al. ............. 416/224 |
| 5,908,522 | A | * | 6/1999 | Lofstrom et al. ........... 156/94 |
| 6,910,867 | B2 | | 6/2005 | Corten |
| 7,357,624 | B2 | | 4/2008 | Wobben |
| 7,637,721 | B2 | * | 12/2009 | Driver et al. ............. 416/224 |
| 2006/0216153 | A1 | | 9/2006 | Wobben |
| 2007/0297909 | A1 | | 12/2007 | Wobben |
| 2010/0124507 | A1 | * | 5/2010 | Wallace et al. ............ 416/248 |

FOREIGN PATENT DOCUMENTS

| | | |
|---|---|---|
| EP | 1674723 A2 | 6/2006 |
| WO | 2004097215 A1 | 11/2004 |
| WO | 2005035978 A1 | 4/2005 |
| WO | 2007118581 A1 | 10/2007 |

* cited by examiner

*Primary Examiner* — Ninh H Nguyen
(74) *Attorney, Agent, or Firm* — William F. Heinze; Ernest G. Cusick; Frank A. Landgraff

(57) ABSTRACT

A wind turbine blade includes a body having a first surface characteristic; and a sleeve, arranged on the body, having a second surface characteristic which is different from the first surface characteristic.

10 Claims, 3 Drawing Sheets

RETROFIT SLEEVE FOR WIND TURBINE BLADE

CROSS-REFERENCE TO RELATED APPLICATIONS

The subject matter disclosed here generally relates to the material disclosed in commonly-owned, copending U.S. patent application Ser. No. 12/327,456 for "Root Sleeve for Wind Turbine Blade" filed on Dec. 3, 2008.

BACKGROUND OF THE INVENTION

1. Technical Field

The subject matter described here generally relates to wind turbine blades, and, more particularly, to a retrofit sleeve for a wind turbine blade.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a "spinner" or hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that may receive input from an anemometer 18.

The blades 10 generate lift and capture momentum from moving air that is them imparted to the rotor as the blades spin in the "rotor plane." Each blade 10 is typically secured to the hub 9 at its "root" end, and then "spans" radially "outboard" to a free, "tip" end. The front, or "leading edge," of the blade 10 connects the forward-most points of the blade that first contact the air. The rear, or "trailing edge," of the blade 10 is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord." The thickness of a blade 10 varies across the planform, and the term "thickness" is typically used to describe the maximum distance between the low pressure suction surface and the high pressure surface on the opposite side of the blade for any particular chord line. The shape of the blade 10, when viewed perpendicular to the direction of flow, is called the "planform."

BRIEF DESCRIPTION OF THE INVENTION

These and other drawbacks associated with such conventional approaches are addressed here in by providing, in various embodiments, a wind turbine blade including a body having a first surface characteristic; and a sleeve, arranged on the body, having a second surface characteristic which is different from the first surface characteristic.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
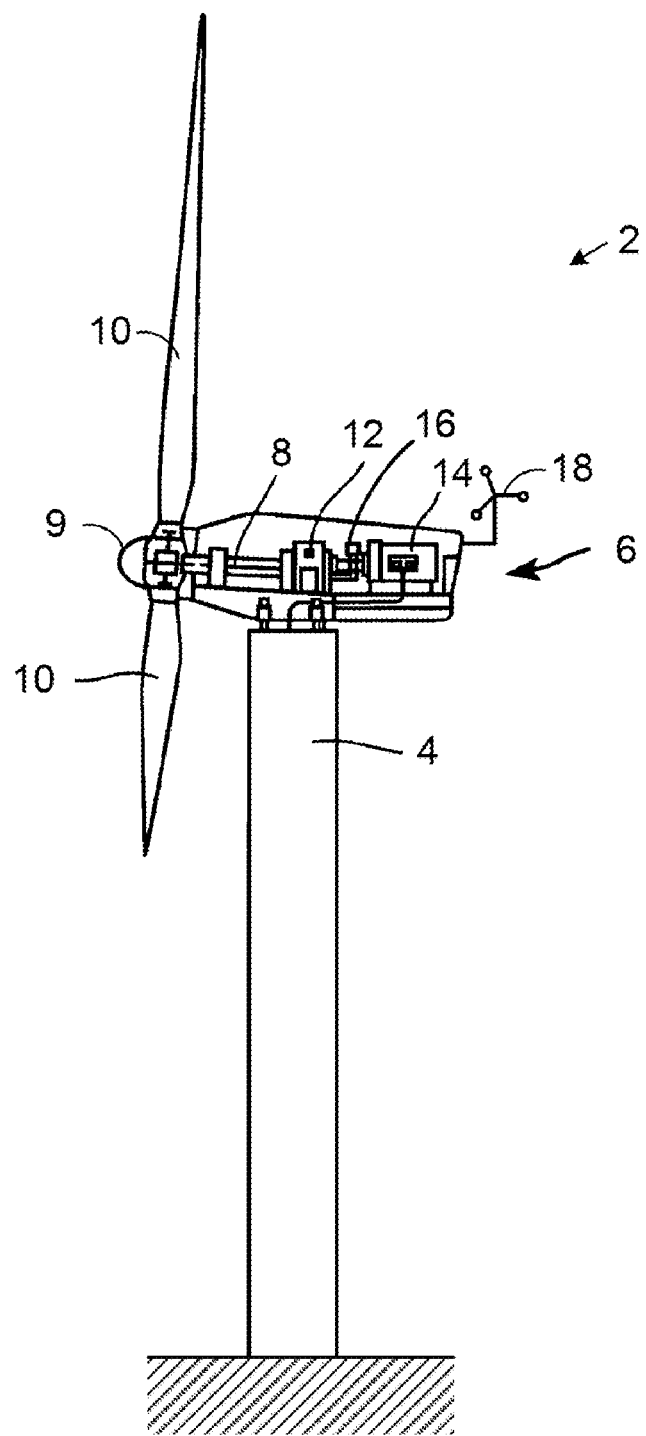
FIG. 1 is a schematic side view of a conventional wind turbine.
Figure 2:
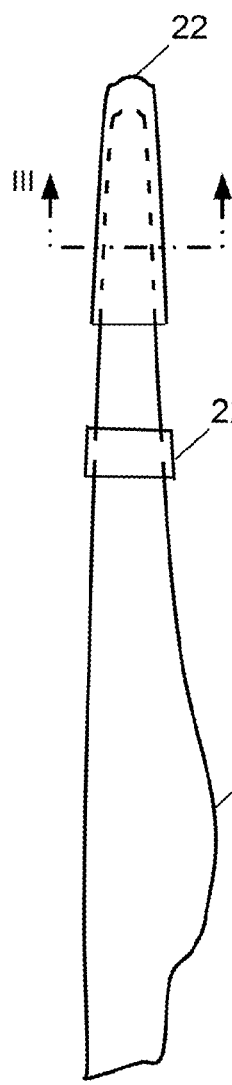
FIG. 2 is a schematic planform view of a wind turbine blade for use with the wind turbine shown in FIG. 1.

FIG. 2 is a planform view of one example of a blade 20 including retrofit sleeves 22 for use with the wind turbine 2 shown in FIG. 1, or any other wind turbine. In the examples illustrated here, the body 24 includes an existing blade 10 that is currently in service. However, a new blade that has not been placed in service may also be used for the body 20.

The sleeves 22 may extend fully or partly around the body 24 and may be secured to the body in a variety of ways including by friction fit, bonding such as adhesive bonding, and/or with various fasteners. The blade does not necessarily need to be substantially modified before the sleeve 22 is attached. For example, the sleeve may be placed over an existing body 20. Alternatively, or in addition, a portion of the body 20 may be removed and the sleeve 22 may be secured with little or no overlap with the existing blade 22. Removing part of the existing body 20 allows shapes to be attached that are smaller and/or thinner than the original body 20. The sleeve 22 may substantially enclose the tip and/or root of the body 24. Alternatively, some of the body 24 may extend from each end of the sleeve 22.

The blade 20 includes a body 24 having a first surface characteristic and one or more sleeves 22 arranged on the body, having a second surface characteristic. The surface characteristics of the sleeves 22 may be substantially the same or different from each other. The surface characteristics of the sleeves 22 may also be substantially the same or different from the surface characteristic of the body 24.

For example, the surface characteristic may be a texture, coating, or shape. These and/or other surface characteristic differences may be used to change the aerodynamic profile and corresponding performance of the blade 10 without the sleeve(s) 22. For example, as illustrated in the cross-section of FIG. 3, the sleeve 22 may provide a different airfoil shape than the body 24. The sleeve 22 may have an inner surface that substantially mates with an outer surface of the body 24. Alternatively, some or all of the inner surface of the sleeve 22 may be spaced from the outer surface of the body 24. Any such space may be filled with various structural and/or bonding materials, including reinforced resin.

Figure 3:
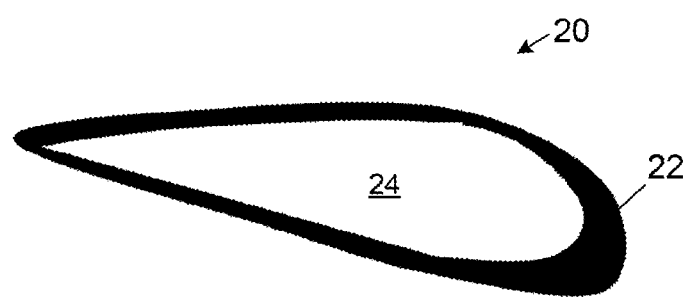
FIG. 3 is a cross-sectional view taken along section line III-III in FIG. 2.
Figures 4, 5:
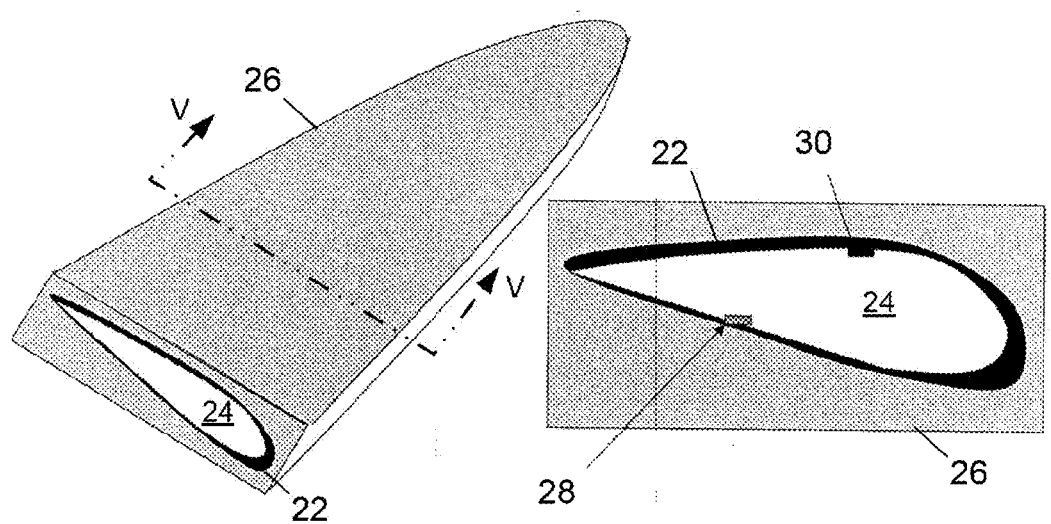
FIG. 4 is a schematic orthographic view of a method of manufacturing a the sleeve for a wind turbine blade shown in FIGS. 2 and 3.
FIG. 5 is a cross-sectional view taken along section line V-V in FIG. 4.

FIG. 4 is a schematic orthographic view of a method of manufacturing a the sleeve 22 shown in FIGS. 2 and 3. The method includes positioning at least a portion of a blade-shaped form in a mold 26. For example, the mold 26 may be an aluminum mold with a very smooth surface and the form may be a copy of the body 24. A curable material is applied to the space between the form and mold 26. For example, the mold 26 may be coated with a resin and an optional reinforcing material such as structural glass or composite fibers.

Alternatively, or in addition, to any such reinforcing material, at least a portion of the blade-shaped form in the mold 26 may be wrapped with a reinforcing material such as structural glass fabric and/or a releasing agent. Once enclosed inside the mold 26, the resin on the mold 26 may be drawn through the glass fabric such as by applying a vacuum source 28. A membrane (not shown) may also be provided in order to improve the vacuum distribution. In addition, the mold 26 may be provided with an infusion line 30 for providing additional resin and/or other material to the mold 26. Once the sleeve 22 is formed, additional components such as adjustable nose contour, moveable trailing edge shapes, and/or devices such as instrumentation or heating elements may be added to the sleeve before it is secured to the body 24. The sleeve may then be secured to the body in the manufacturing facility or the field.

The technology disclosed here helps to provide improved blade performance for an existing blade with or without substantially modifying the existing blade configuration. For example, the sleeve 22 can easily provide modifications that offer increased power and/or decreased noise for an existing blade. Various features may also be easily added to existing blade designs such as improved nose contours, increased profile thickness, longer and altered trailing edge configurations, longer and altered tip configurations, and/or added elements such as heating elements for deicing. Existing blade designs and inventories can therefore be inexpensively improved, repaired, and/or modified for new operating environments.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine blade, comprising:
   a body having a first airfoil shape; and
   a sleeve, arranged on the body, having a second airfoil shape which is different from the first airfoil shape; and
   wherein the sleeve encloses a leading and trailing edge of the blade.

2. The wind turbine blade recited in claim 1, wherein an inboard edge of the sleeve engages the body.

3. The wind turbine recited in claim 2, wherein the body includes a tip and the sleeve substantially covers the tip.

4. The wind turbine blade recited in claim 1, wherein the sleeve has an inner surface that substantially mates with an outer surface of the body.

5. The wind turbine recited in claim 4, wherein the body includes a tip and the sleeve substantially covers the tip.

6. The wind turbine recited in claim 1, wherein the body includes a tip and the sleeve substantially covers the tip.

7. A wind turbine blade, comprising:
   a body having a first airfoil shape; and
   a sleeve, arranged on the body, having a second airfoil shape which is different from the first airfoil shape; and
   wherein portions of the body extend from each end of the sleeve.

8. The wind turbine recited in claim 7, wherein an inboard edge of the sleeve engages the body.

9. A wind turbine blade, comprising:
   a body having a first airfoil shape; and
   a sleeve, arranged on the body, having a second airfoil shape which is different from the first airfoil shape;
   wherein an inboard edge of the sleeve engages the body; and
   wherein portions of the body extend from each end of the sleeve.

10. A wind turbine blade, comprising:
    a body having a first airfoil shape; and
    a sleeve, arranged on the body, having a second airfoil shape which is different from the first airfoil shape;
    wherein the sleeve has an inner surface that substantially mates with an outer surface of the body;
    wherein portions of the body extend from each end of the sleeve.

* * * * *